United States Patent

[11] 3,599,350

[72] Inventor Arthur Moskowitz
Winter Park, Fla.
[21] Appl. No. 28,839
[22] Filed Apr. 15, 1970
[45] Patented Aug. 17, 1971
[73] Assignee The United States of America as represented by the Secretary of the Navy

[54] EDUCATIONAL DEVICE FOR USE IN CONVERSION BETWEEN NUMBER SYSTEMS
9 Claims, 14 Drawing Figs.

[52] U.S. Cl. ............................................................. 35/30
[51] Int. Cl. ....................................................... G09b 19/02
[50] Field of Search .................................................. 35/30, 31 R, 31 A, 74, 76; 235/71, 74, 85, 86, 88, 108, 114, 125

[56] References Cited
UNITED STATES PATENTS

| | | | |
|---|---|---|---|
| 1,246,860 | 11/1917 | Brachtl et al. | 35/76 UX |
| 1,394,305 | 10/1921 | Hurley | 35/76 |
| 3,055,121 | 9/1962 | Neal | 35/31 A |

*Primary Examiner*—William H. Grieb
*Attorneys*—Richard S. Sciascia, John W. Pease and Harvey A. David ABSTRACT: An educational device comprising a base member, a front panel having a plurality of windows, arranged in rows and columns movable indicator members viewable through the windows to provide numeric information useful in the conversion between number systems. In one embodiment the movable indicator members include a slide member and a plurality of rotatable discs. In a second embodiment the movable indicator members comprises a plurality of rotatable drums.

FIG. 2

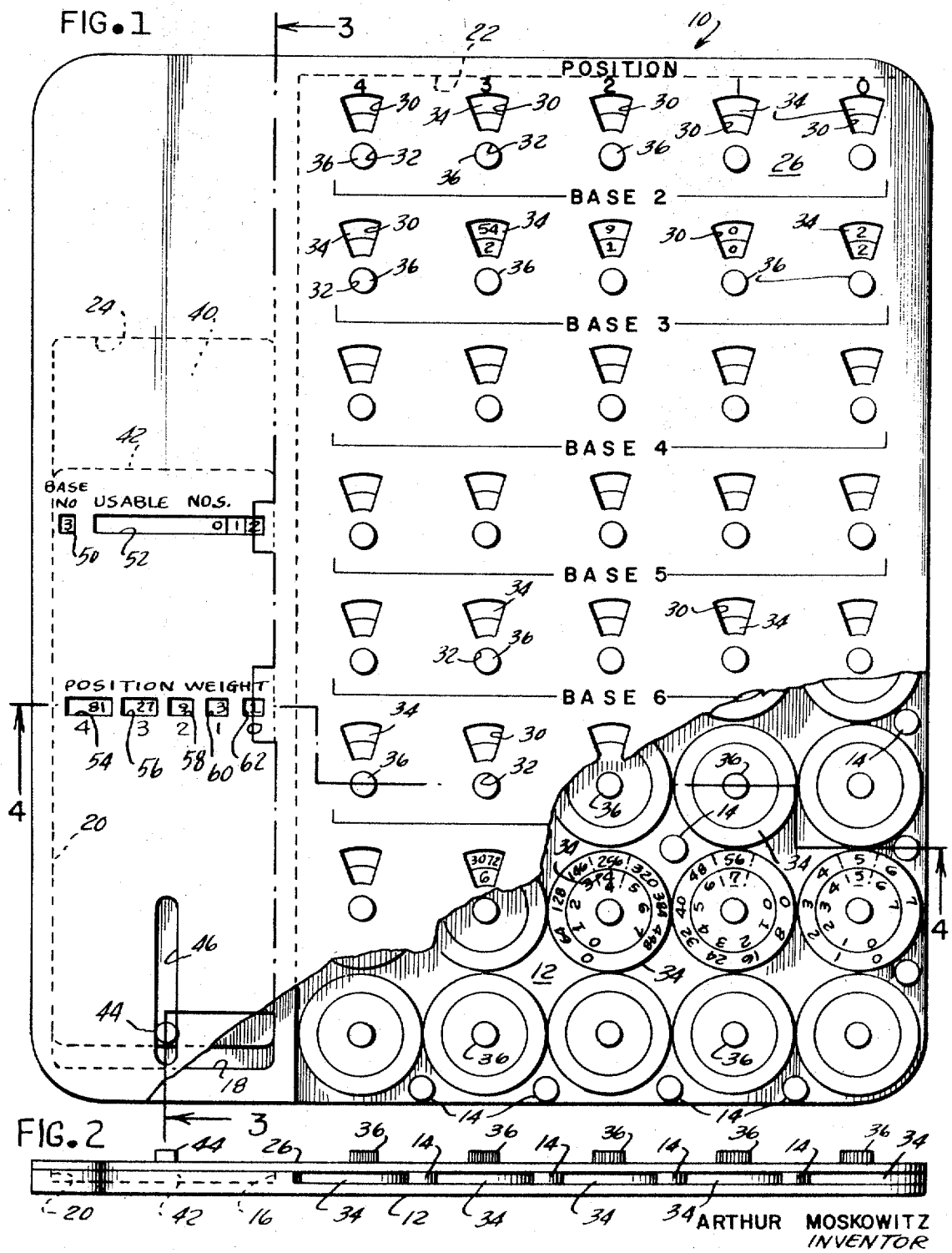

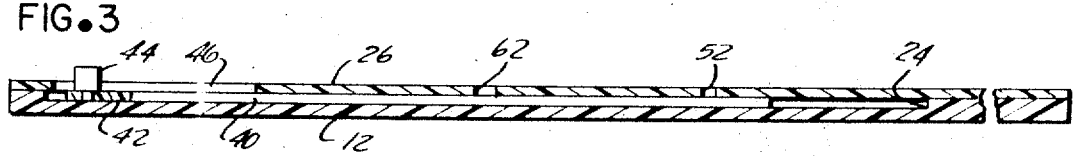
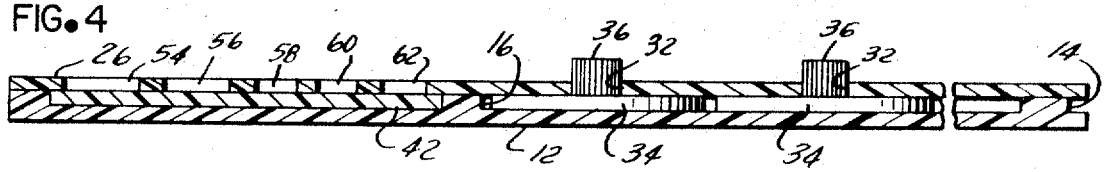
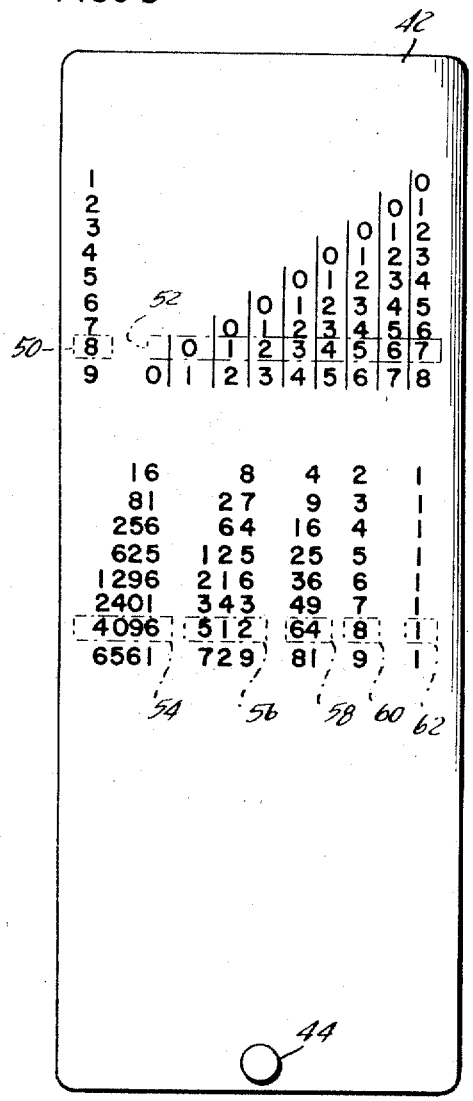
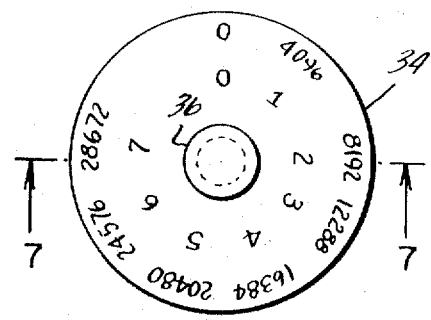
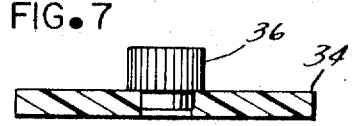
ARTHUR MOSKOWITZ
INVENTOR

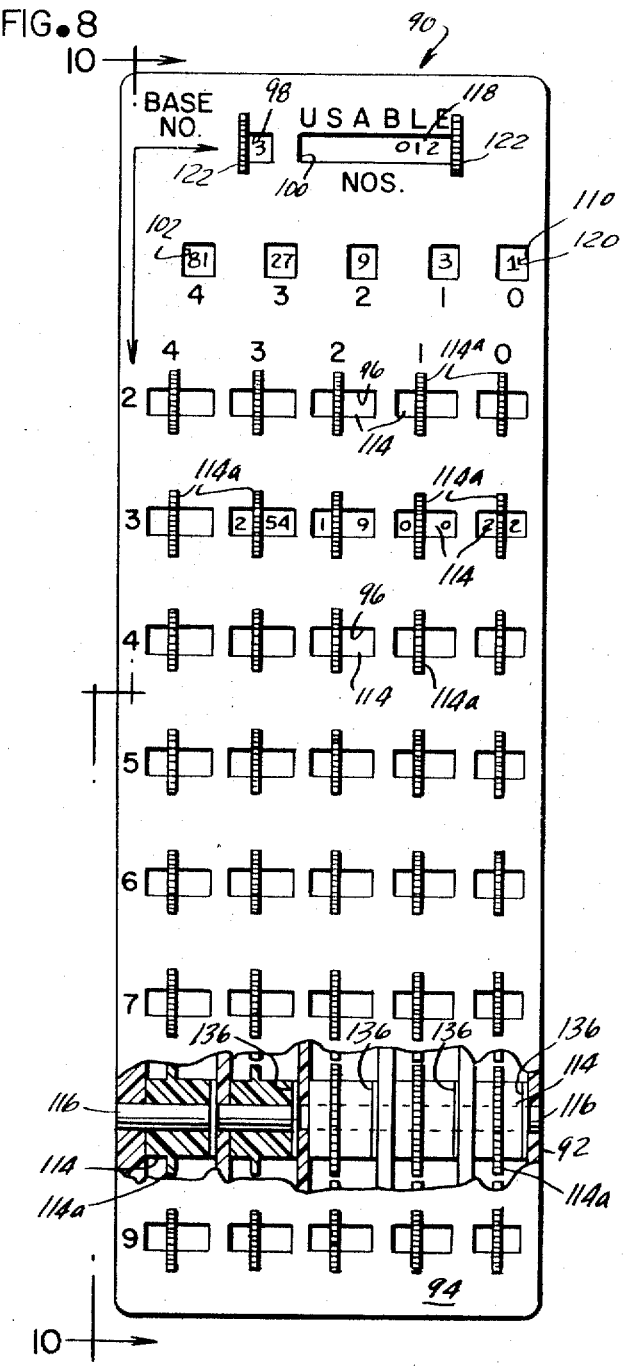
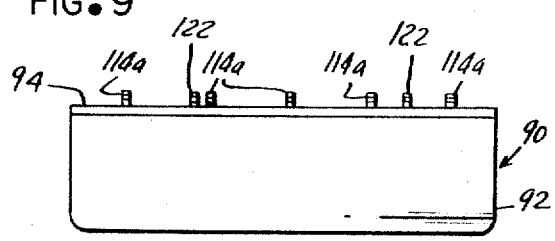

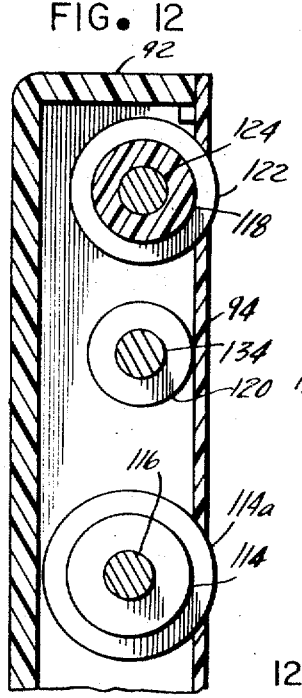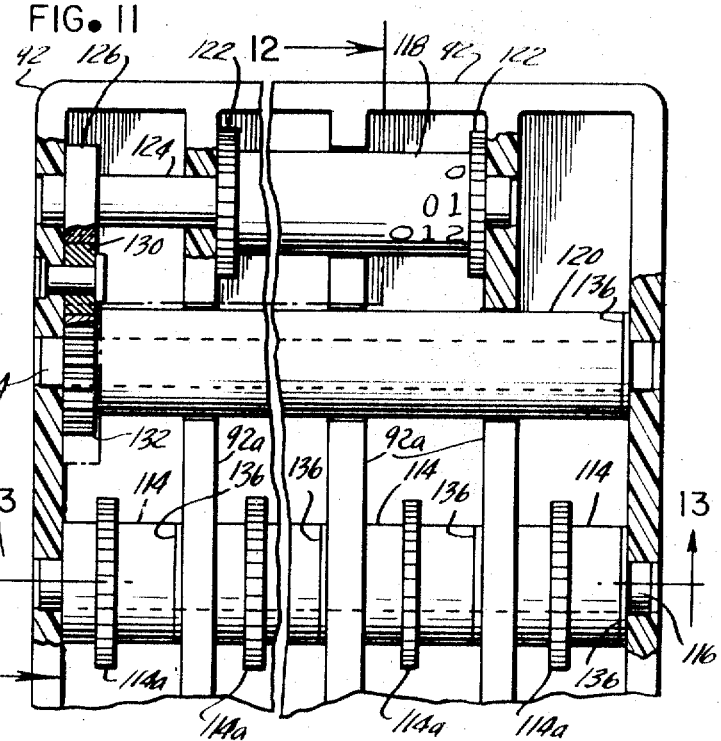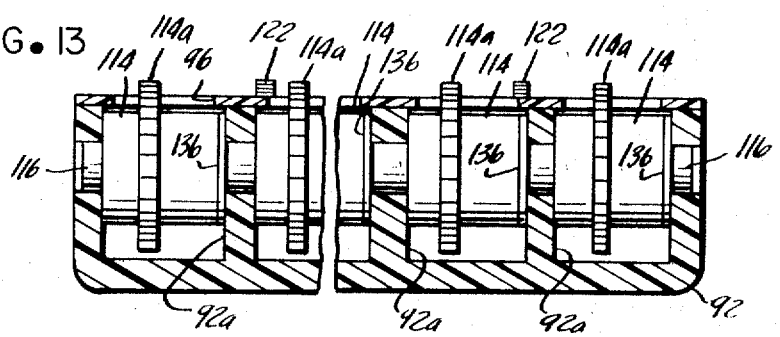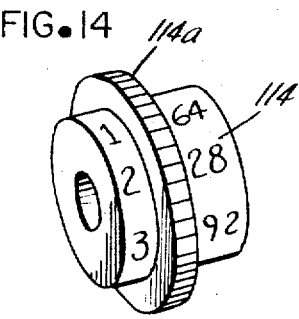

3,599,350

EDUCATIONAL DEVICE FOR USE IN CONVERSION BETWEEN NUMBER SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to educational devices and more particularly to devices useful in the teaching and understanding of different number systems and the principles of conversion from one number system to another.

With increased use of digital computers by the Armed Services and industry, additional courses of instruction are being given by military and public schools alike in the fundamentals of digital computation. One of the difficulties encountered in the teaching and learning of digital computation is that concerned with number systems different from the one we normally use, i.e. the decimal or base 10 system. Decimal numbers are instantly recognized and read, or calculations performed with them, either on paper or in our heads, without considering all the arithmetic processes involved. However, to properly understand the basic operation of digital computers, it is necessary to analyze number systems and to break down each arithmetic process to its simplest parts.

SUMMARY OF THE INVENTION

With the foregoing in mind, it is a principal object of this invention to provide a number systems calculating and instructional device for use by computer operators and technicians requiring a knowledge of computer mathematics in order to understand the operation of and perform maintenance on computer equipment.

It is another object of the invention to provide an improved device of the foregoing character which will fulfill an existing need in schools teaching digital computer fundamentals or the topic of number system in mathematics courses, and which will be useful to engineers, data processing and programming personnel in providing them with ready reference for converting between number systems.

As another object the invention aims to provide a convenient, hand-held calculator and instructional device useful in converting a number expressed in any base number system (from base 2 to base 9) to its decimal equivalent, or vice versa, and useful in converting any given number in a system to an equivalent number in any other system from base 2 to base 9.

Still another object of the invention is the provision of such a device which can be economically manufactured of plastics or the like and can be supplied to students as a hand-out item which can be retained by them.

The invention may be further said to reside in certain novel constructions, combinations, and arrangements of parts by which the foregoing objects and advantages are achieved, as well as others which will become apparent from the following detailed description of the preferred embodiments when read in conjunction with the accompanying sheets of drawings.

DESCRIPTION OF THE DRAWINGS

FIG. 1 is a plan view of an educational device embodying the present invention, with parts broken away to reveal other parts;

FIG. 2 is an end view of the device of FIG. 1;

FIG. 3 is a sectional view taken substantially along line 3-3 of FIG. 1;

FIG. 4 is a sectional view taken substantially along line 4-4 of FIG. 1;

FIG. 5 is a plan view of a slide member of the device of FIG. 1;

FIG. 6 is a plan view of an indicator disc of the device of FIG. 1;

FIG. 7 is a sectional view taken substantially along line 7-7 of FIG. 6;

FIG. 8 is a plan view of another embodiment of the invention with some portions broken away and in section;

FIG. 9 is an end view of the device of FIG. 8;

FIG. 10 is a side view of the device of FIG. 8 with other portions broken away;

FIG. 11 is a fragmentary view, on an enlarged scale, showing details of construction of the device of FIG. 8;

FIG. 12 is a sectional view taken substantially along line 12-12 of FIG. 11;

FIG. 13 is a sectional view taken substantially along line 13-13 of FIG. 11; and FIG. 14 is a perspective view of an indicator drum of the device of FIG. 8.

DESCRIPTION OF THE PREFERRED EMBODIMENTS

In the form of the invention illustrated in FIGS. 1 through 7 of the drawings, and described hereinafter, there is provided a number system converting device, generally indicated at 10. The device 10 comprises generally flat, rectangular base member 12 which is conveniently formed, as by molding, of a suitable plastic material such as polyvinylchloride. The base member 12 carries, either integrally therewith or cemented thereto, spacing means including a plurality of posts 14, ribs 16, 18, 20, and 22, and a thickened corner area 24.

Mounted on the spacer means 14, 16, 18, 20, 22, and 24 is a generally rectangular front panel 26, also conveniently molded of plastic and held in spaced, congruent relation to the base member by cement or the like applied between the front panel and the spacer means. The front panel 26 is characterized by a plurality of windows 30 arranged, as viewed in FIG. 1, in eight horizontal rows of five windows in each row. Each row is utilized with reference to an individual number system. Thus, the top row, as viewed in FIG. 1, has reference to the number system having as base of 2, the next row has reference to the number system having a base of 3, and so on to the last row which has reference to the number system having a base of 9. Moreover, the windows 30 are arranged in vertical columns representing positions in a number. Thus, the right-hand column is designated position 0, the next column to the left as position 1, and so on to the last column on the left which is designated as position 4. Adjacent each window 30 is an opening 32, the purposes of which windows and openings will become apparent as this description proceeds.

Disposed between the base member 12 and the front panel 26 are a plurality of rotatable indicia-carrying elements in the form of discs 34. Referring to FIGS. 6 and 7 which illustrate a representative one of the discs 34, it will be seen that these discs are each provided with an axially extending knob 36. The knobs are rotatably received through the openings 32 in the front panel 26. Each of the discs 34 carry inner and outer sets of numerals which are circularly arranged so that selected numbers comprised of those numerals appear in the windows 30 upon rotation of the knobs 36.

Reverting to FIG. 1, it will be seen that between the front panel 26 and the base member 12 the spacer ribs 16, 18, and 20, and the thickened corner area 24 define a rectangular cavity 40. In this space 40 is disposed a movable, rectangular slide member 42, the long dimension of which is substantially shorter than the long dimension of the cavity 40. The slide member 42, which is best illustrated in FIG. 5, is provided with a knob 44 which extends through a slot 46 defined in the front panel 26. The slide member 42 carries rows of numbers in two sets the first of which are selectively viewable through windows 50 and 52 in the front panel 26, and the second of which sets are selectively viewable through windows 54, 56, 58, 60, and 62 in the front panel upon movement of the slide through the agency of the knob 44. Operation of the slide 42 to bring to view in window 50 a base number of a system to be involved in a conversion will bring into view in window 52 the usable numbers in that system, and will also bring into view in windows 54, 56, 58, 60, and 62 numbers which are the decimal weight factor to be applied to the usable numbers when located in the positions 4, 3, 2, 1, and 0 represented respectively by the last mentioned windows. Thus, if the slide 42 is positioned as illustrated in FIG. 1 with the base number of radix 3 appearing in window 50, it will be seen that the usable numbers for the base 3 system are 0, 1, and 2. It will also be seen from windows 54—62 that the weight factor for position 4 is 81, for position 3 is 27, for 2 is 9, for 1 is 3, and for 0 is 1.

Now, the inner circle of numbers on each disc 34 represents the usable numbers for the base system for which the particular disc is to be used. Thus, each disc in the second row (base 3) will have as its inner circle of numbers, those numbers showing in the window 52. Similarly, the typical disc illustrated in FIG. 6 has as its inner circle of numbers the usable numbers for base 8.

The outer circle of numbers on each disc 34 comprises, corresponding to each inner circle number, the product of that inner circle number and the position weight factor for the base number and the position number for which the particular disc is to be used. The following tables will provide the corresponding inner and outer numbers for each of the forty discs 34 used in the device 10:

BASE 2

| | Outer circle numbers in place positions | | | | |
|---|---|---|---|---|---|
| | 4 | 3 | 2 | 1 | 0 |
| Inner circle numbers: | | | | | |
| 0 | 0 | 0 | 0 | 0 | 0 |
| 1 | 16 | 8 | 4 | 2 | 1 |

BASE 3

| | Outer circle numbers in place positions | | | | |
|---|---|---|---|---|---|
| | 4 | 3 | 2 | 1 | 0 |
| Inner circle numbers: | | | | | |
| 0 | 0 | 0 | 0 | 0 | 0 |
| 1 | 81 | 27 | 9 | 3 | 1 |
| 2 | 162 | 54 | 18 | 6 | 2 |

BASE 4

| | Outer circle numbers in place positions | | | | |
|---|---|---|---|---|---|
| | 4 | 3 | 2 | 1 | 0 |
| Inner circle numbers: | | | | | |
| 0 | 0 | 0 | 0 | 0 | 0 |
| 1 | 256 | 64 | 16 | 4 | 1 |
| 2 | 512 | 128 | 32 | 8 | 2 |
| 3 | 768 | 192 | 48 | 12 | 3 |

BASE 5

| | Outer circle numbers in place positions | | | | |
|---|---|---|---|---|---|
| | 4 | 3 | 2 | 1 | 0 |
| Inner circle numbers: | | | | | |
| 0 | 0 | 0 | 0 | 0 | 0 |
| 1 | 625 | 125 | 25 | 5 | 1 |
| 2 | 1,250 | 250 | 50 | 10 | 2 |
| 3 | 1,875 | 375 | 75 | 15 | 3 |
| 4 | 2,500 | 500 | 100 | 20 | 4 |

BASE 6

| | Outer circle numbers in place positions | | | | |
|---|---|---|---|---|---|
| | 4 | 3 | 2 | 1 | 0 |
| Inner circle numbers: | | | | | |
| 0 | 0 | 0 | 0 | 0 | 0 |
| 1 | 1,296 | 216 | 36 | 6 | 1 |
| 2 | 2,592 | 432 | 72 | 12 | 2 |
| 3 | 3,888 | 648 | 108 | 18 | 3 |
| 4 | 5,184 | 864 | 144 | 24 | 4 |
| 5 | 6,480 | 1,080 | 180 | 30 | 5 |

BASE 7

| | Outer circle numbers in place positions | | | | |
|---|---|---|---|---|---|
| | 4 | 3 | 2 | 1 | 0 |
| Inner circle numbers: | | | | | |
| 0 | 0 | 0 | 0 | 0 | 0 |
| 1 | 2,401 | 343 | 49 | 7 | 1 |
| 2 | 4,802 | 686 | 98 | 14 | 2 |
| 3 | 7,203 | 1,029 | 147 | 21 | 3 |
| 4 | 9,604 | 1,372 | 196 | 23 | 4 |
| 5 | 12,005 | 1,715 | 245 | 35 | 5 |
| 6 | 14,406 | 2,058 | 294 | 42 | 6 |

BASE 8

| | Outer circle numbers in place positions | | | | |
|---|---|---|---|---|---|
| | 4 | 3 | 2 | 1 | 0 |
| Inner circle numbers: | | | | | |
| 0 | 0 | 0 | 0 | 0 | 0 |
| 1 | 4,096 | 512 | 64 | 8 | 1 |
| 2 | 8,192 | 1,024 | 128 | 16 | 2 |
| 3 | 12,288 | 1,536 | 192 | 24 | 3 |
| 4 | 16,384 | 2,048 | 256 | 32 | 4 |
| 5 | 20,480 | 2,560 | 320 | 40 | 5 |
| 6 | 24,576 | 3,072 | 384 | 48 | 6 |
| 7 | 28,672 | 3,584 | 448 | 56 | 7 |

BASE 9

| | Outer circle numbers in place positions | | | | |
|---|---|---|---|---|---|
| | 4 | 3 | 2 | 1 | 0 |
| Inner circle numbers: | | | | | |
| 0 | 0 | 0 | 0 | 0 | 0 |
| 1 | 6,561 | 729 | 81 | 9 | 1 |
| 2 | 13,122 | 1,458 | 162 | 18 | 2 |
| 3 | 19,683 | 2,187 | 243 | 27 | 3 |
| 4 | 26,244 | 2,916 | 324 | 36 | 4 |
| 5 | 32,805 | 3,645 | 405 | 45 | 5 |
| 6 | 39,366 | 4,374 | 486 | 54 | 6 |
| 7 | 45,927 | 5,103 | 567 | 63 | 7 |
| 8 | 52,488 | 5,832 | 648 | 72 | 8 |

In the operation of the device 10, if it is desired to convert the ternary or base 3 number 2102 to its decimal equivalent, it is first necessary to turn the knobs 36 in the base 3 row so that the ternary number is represented by the inner circle numbers appearing in the windows 30 as is illustrated in FIG. 1. Thus, the position 3 knob is rotated to show the inner circle number 2 and its corresponding outer circle number 54, the position 2 knob is rotated to show the inner circle number and the corresponding outer circle number 9, the position 1 knob is rotated to show inner and outer numbers 0 and 0, and the position 1 knob to show numbers 2 and 2. Now, the outer circle numbers are merely added, rendering the decimal number 65 as the equivalent of the ternary number 2102.

Supposing one desires to convert a decimal number e.g. 3389 to its octal or base 8 equivalent, it is first necessary to operate the slide knob 44 to bring numeral 8 into view in window 50. This will place in the window 52 the usable numbers enclosed in the dotted line representation of window 52 in FIG. 5. This will also place in windows 54, 56, 58, 60 and 62 the position weight numbers as shown in FIG. 5, which numbers are powers of 8. Next, find the largest position weight number (power of 8) in 3,389. The position 4 weight number 4,096 is too large, but the position 3 weight number 512 will go. Accordingly, the position 3 knob in the base 8 row is rotated to bring the largest outer number into view which will go into 3,389. This is seen to be the number 3,072 which has a corresponding inner number of 6. The difference between 3,389 and 3,072 is 317. Accordingly the position 2 knob is rotated to show the largest outer number which will go into 317, namely 256, the corresponding inner number being 4.

The difference between 317 and 256 is 61, so the position 1 knob is turned to bring into view the largest number which will go into 61, namely 56, the corresponding inner number being 7. The difference between 61 and 56 is 5, so the zero position knob is rotated to bring outer number 5 into view with its corresponding inner number 5. The octal number 6,475 is now read directly from the device as being the equivalent of the decimal number 3,389.

To change from a number of a first nondecimal base to a number of a second nondecimal base it is only necessary to convert the number from the first nondecimal base into decimal form as a middle step and then from decimal form into the second nondecimal base using the same principles as exemplified above.

Another embodiment of the invention, indicated generallly at 90, will be described with reference to FIGS. 8—14. The device 90 comprises a rectangular boxlike base member 92 which is divided lengthwise by parallel wall portions 92a into five cavities. A front panel 94 is mounted on the base member 92 and is provided with a plurality of windows 96 arranged in eight horizontal rows of five windows in each row, the windows being also arranged in five vertical columns. As in the device 10, each of the eight rows is representative of a number of system from base 2 to base 9, and the columns are representative of position places in the number systems.

Additional windows 98 and 100 are provided for revealing, respectively, a selected base number and the usable numbers in the selected system. Windows 102, 104, 106 and 108, and 110 are provided to reveal the position weights corresponding to a selected number system.

Mounted in the base 92 for viewing through the windows 96 are a plurality of indicator drums 114. The drums 114, which are separated by the wall portions 92a, are rotatably mounted on axle shafts 116 extending through apertures in the wall portions and secured as by cementing.

Each drum 114, best illustrated in FIG. 14, comprises a raised thumbwheel 114a, the periphery of which extends above the surface of the front panel, as shown in FIG. 13, to permit easy rotation of the drum. The thumbwheel also serves to divide the drum into left and right segments on which are placed numbers which are equivalent to the numbers in the inner and outer circles, respectively, of the discs 34 of the device 10.

As is best illustrated in FIGS. 11 and 12, the device 90 comprises indicator drums 118 and 120, the drum 118 bearing numbers which are to be displayed through windows 98, 100, and the drum 120 bearing numbers which are to be displayed through windows 102, 104, 106, 108, and 110. The drum 118 has thumbwheels 122 for manipulation thereof, the drum being fixed to a shaft 124 which is journaled in apertures in the wall portions of the base member 92. Fixed to the shaft 124 for rotation therewith is a pinion gear 126 which is in driving mesh with an idler gear 130 which is in turn in driving mesh with a gear 132 fixed to the drum 120. The latter is rotatably supported by a shaft 134. Operation of a thumbwheel 122 to bring a selected base number into view in window 98 will simultaneously bring the usable numbers of the selected system into view in window 100, and, through the operation of gears 126, 130 and 132, will bring the appropriate position weight numbers into view in the windows 102, 104, 106, 108, and 110.

In order to preclude undesired rotation of the drums 114 from selected positions, a spring washer 136 is conveniently inserted between each drum 114 and an adjacent wall portion of the base 92.

Similarly an identical washer 136 is disposed between the drum 120 and the adjacent wall portion of the base 92. The latter washer serves to maintain the positions of both of drums 118 and 120 inasmuch as they are geared together.

It will be appreciated that the drums 118, 120 and the associated gearing provide the same information as the slide 42 in the earlier described device 10. Operation of the device 92 is generally the same as that of the device 10, remembering that the numbers on the left and right portions of the drums 114, viewable through the windows 96, correspond respectively to the inner and outer circles of numbers on the discs 34. Accordingly, no further description of the operation of the device 92 is believed necessary.

From the foregoing detailed description of several embodiments of the invention it will be recognized that the aforementioned objects and advantages have been achieved, as well as others apparent from the description.

Obviously many modifications and variations of the present invention are possible in the light of the above teachings. It is therefore to be understood that within the scope of the appended claims the invention may be practiced otherwise than as specifically described.

What I claim is:

1. A device for use in conversion of numbers from a number system of one base to a number system of a different base, said device comprising:

a rectangular base having a plurality of rotatable indicator means arranged in horizontal rows and vertical columns, each row corresponding to a different number system and the number of indicator means in each row corresponding to the number of number numbers to be accommodated for each number system;

each of said indicator means in any given row having first and second sets of numbers thereon, the first set representing usable numbers for the system of the given row and the second set comprising the products of the usable number and position weight values for the respective number position columns occupied by the indicator means;

panel means overlying said base and said indicator means, said panel means having a plurality of windows corresponding to said plurality of indicator means; and manual operating means connected to each of said indicator means for effecting selected movements thereof to bring selected ones of said first and second sets of numbers into view through said windows.

2. A device as defined in claim 1, and further comprising: additional indicator means mounted on said base member and beneath said panel means;

said panel means having additional windows therein; and means for actuating said additional indicator means to simultaneously bring into view in said additional window means a selected system base number and the usable numbers for the selected system.

3. A device as defined in claim 1, and wherein:

said indicator means each comprises a disc; and said manual operating means comprises a knob extending upwardly from each disc through said panel means.

4. A device as defined in claim 2, and wherein:

said additional indicator means comprises a rectangular slide member;

said base member and said panel means defining a space wherein said slide can be moved linearly therebetween; and a knob extending from said slide through a slot in said panel means for effecting linear movement of said slide.

5. A device as defined in claim 3, and further comprising:

additional indicator means mounted on said base member and beneath said panel means;

said panel means having additional windows therein;

means for actuating said additional indicator means to simultaneously bring into view in said additional window means a selected system base number and the usable numbers for the selected system;

said additional indicator means comprising a rectangular slide member;

said base member and said panel means defining a space wherein said slide can be moved linearly therebetween; and a knob extending from said slide through a slot in said panel means for effecting linear movement of said slide.

6. A device as defined in claim 1, and wherein:

said indicator means each comprises a drum rotatably supported with respect to said base;

said manual operating means comprises a thumbwheel extending radially from each of said drums, with the periphery of said thumbwheel extending above the upper surface of said panel means; and said thumbwheel serving to divide the associated drum into two separate indicator surfaces for said first and second sets of numbers, respectively.

7. A device as defined in claim 6, and further comprising:
additional indicator means mounted on said base member and beneath said panel means;
said panel means having additional windows therein; and
means for actuating said additional indicator means to simultaneously bring into view in said additional window means a selected system base number and the usable numbers for the selected system.

8. A device as defined in claim 7, and wherein said additional indicator means comprises:
a first additional drum rotatably mounted on said base and having a thumbwheel for rotation thereof;
a second additional drum rotatably mounted on said base for rotation about an axis parallel to that of said first additional drum;
a driving gear connected to said first additional drum for rotation therewith;
an idler gear rotatably mounted on said base and in mesh with said driving gear; and
a driven gear connected to said second additional drum and in mesh with said idler gear, so that rotation of said first additional drum by the thumbwheel thereof will effect simultaneous rotation of said second additional drum.

9. A device as defined in claim 8 and further comprising:
resilient means disposed between the first mentioned drums and said base for frictionally resisting rotation of said drums.